June 2, 1942. KARL-GEORG HOLSTEN 2,285,092

GONIOMETER

Filed Jan. 16, 1941

Inventor:
Karl-Georg Holsten
by E. D. Phinney
Att'y

Patented June 2, 1942

2,285,092

UNITED STATES PATENT OFFICE 2,285,092

GONIOMETER

Karl-Georg Holsten, Berlin, Germany, assignor to C. Lorenz Aktiengesellschaft, Berlin-Tempelhof, Germany, a company Application January 16, 1941, Serial No. 374,653
In Germany January 25, 1940

3 Claims. (Cl. 250—11)

Goniometers are known in which the field coils, arranged to intersect at right angles, are wound on a carrier body common to them and within which a rotatable coil, the so-called search or seeker coil, is mounted. The field coils of these arrangements may happen to influence each other, especially in cases where short waves are employed.

According to the invention one of the field coils and a search coil are arranged to constitute one part of a goniometer while the second field coil, offset at right angles with respect to the former, is likewise combined with a search coil to form a second part of the goniometer. The shafts of the search coils are coupled together, the two goniometers thus being combined to constitute a complete geniometer appliance.

Figure 1:
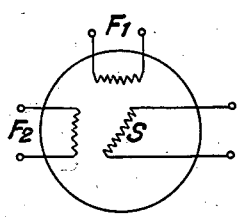
Figure 2:
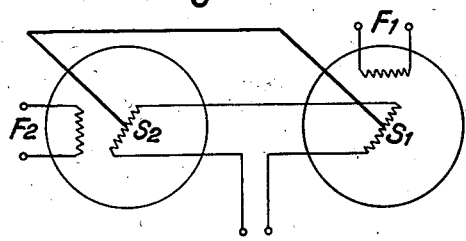
Figure 3:
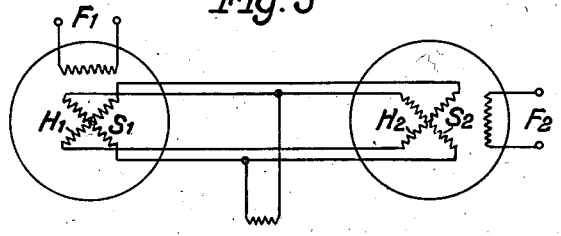
Figure 4:
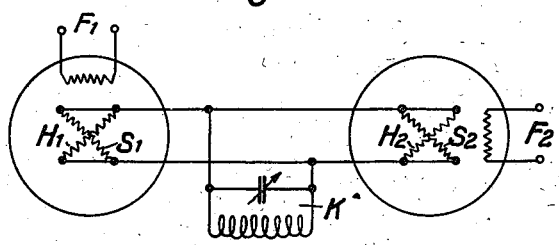
Figure 5A:
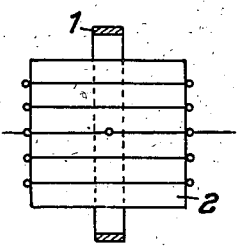
Figure 5B:
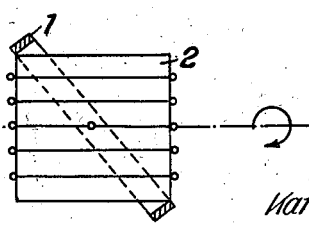

In the drawing, Fig. 1 is a diagrammatic representation of a known goniometer. Fig. 2 is a diagrammatic view showing one embodiment of the invention. Fig. 3 is a diagram illustrating an improvement upon the arrangement represented in Fig. 2. Fig. 4 is a diagram that shows an improvement upon the arrangement according to Fig. 3. Figs. 5a and 5b represent a further improvement upon the devices shown in Figs. 2 to 4.

In the known arrangement according to Fig. 1 $F_1$ and $F_2$ are field coils while S is a search coil.

The novel arrangement according to Fig. 2 comprises two field coils $F_1$, $F_2$ and two search coils $S_1$, $S_2$. The coils $F_1$, $S_1$ constitute one goniometer part while the coils $F_2$, $S_2$ constitute a second goniometer part. The shafts of the coils $S_1$, $S_2$ are interconnected by suitable coupling means, as shown. The arrangement represented in Fig. 2 thus is a complete goniometer appliance. The coils $S_1$, $S_2$ are connected in series. This arrangement has the advantage that the field coils are prevented from influencing each other and further, that the manufacture is simpler than in the case of prior devices.

The search coils, especially if employed in short wave goniometers, are required to have a low inductivity. For this purpose the coils $S_1$, $S_2$ may be connected in parallel, as shown in Fig. 3. This arrangement causes the maximum current to flow whenever the direction-indicating position of the goniometer has been attained. At the same time, however, when the goniometer is rotated over, the disadvantage arises that the field coils $F_1$, $F_2$ are not charged both in the same degree. As a result the curve of errors will contain an octantal error which in addition is variable in accordance with variations of the load on the field coils. In order to avoid this error auxiliary coils $H_1$, $H_2$ may be arranged perpendicularly to the coils $S_1$, $S_2$ and interconnected in the same manner as the coils $S_1$, $S_2$. The reactions of the coils $S_1$, $S_2$, $H_1$, $H_2$ on the coils $F_1$, $F_2$ are complementary to each other as to the value I, whereby an octantal error will be obviated.

If a search coil is tuned to a certain frequency then in the case of resonance the current of this coil rises. The coil traversed by the stronger current then has a stronger reaction and hence acts again to produce an octantal error the magnitude of which depends on the frequency to which the coil has been tuned. In order to avoid this drawback the arrangement shown in Fig. 4 may be adopted. The coils $S_1$, $S_2$, $H_1$, $H_2$ are here all interconnected in parallel and tuned by means of a tuning circuit K. This arrangement is important especially for the production of rotating fields in goniometers, because in this case it acts to prevent the rotating fields from becoming distorted by the search coil receiving power. For effecting the well-known sense determination, the polarity of the coils $H_1$, $H_2$ may be changed. In prior devices such change of polarity causes the search coils to rotate by 90°, whereby the total field is each time turned by 90° out of the direction-indicating position. Sense determination will be possible in well-known manner with the aid of an aerial added to the composite goniometer here described.

Care should be taken that the coil systems of the two component goniometers do not differ from one another since any such difference entails a quadrantal error. This requirement, however, is difficult to fulfil as it renders the manufacture troublesome and costly. Therefore, according to one feature of the present invention, each component goniometer 2, Figs. 5a and 5b, is provided with a rotatably mounted metal ring I, made of copper or aluminium, for instance, and arranged to enclose all the windings of the respective goniometer 2.

Fig. 5a shows the ring I to be in the zero position, that is, the position in which the goniometer field is not influenced by the ring I. With ring I positioned as shown in Fig. 5b by way of example the field, and hence the coupling between field and search coil, is lessened. The rings I thus are a simple means for tuning the goniometers 2 in a manner to obviate the quadrantal error which otherwise would arise through dissimilarities of the two coil systems.

What is claimed is:

1. A goniometer comprising a field coil and a search coil, these two constituting a goniometer component, a second field coil offset at right angles with respect to the former field coil, and a second search coil, such second field coil and search coil constituting a second goniometer component two auxiliary coils connected in circuit with each other, one of these coils being arranged perpendicularly to one of the search coils and the other auxiliary coil being arranged perpendicularly to the other search coil, the two search coils being connected in circuit with one another and having shafts coupled together.

2. A goniometer according to claim 1, wherein the search coils are connected in parallel.

3. A goniometer according to claim 1, further comprising means for interconnecting all the said search coils and auxiliary coils in parallel.

KARL-GEORG HOLSTEN.